US007614129B2

(12) United States Patent
Matthew

(10) Patent No.: US 7,614,129 B2
(45) Date of Patent: Nov. 10, 2009

(54) PAPERMAKING REFINER PLATES AND METHOD OF MANUFACTURE

(75) Inventor: John B Matthew, Norwalk, CT (US)

(73) Assignee: Norwalk Industrial Components, LLC, Manchester, CT (US)

( * ) Notice: Subject to any disclaimer, the term of this patent is extended or adjusted under 35 U.S.C. 154(b) by 522 days.

(21) Appl. No.: 11/166,700

(22) Filed: Jun. 24, 2005

(65) Prior Publication Data

US 2006/0289689 A1 Dec. 28, 2006

Related U.S. Application Data

(62) Division of application No. 09/462,696, filed on Jul. 18, 2000, now Pat. No. 6,935,589.

(51) Int. Cl.
*B23P 11/00* (2006.01)
*B02C 13/28* (2006.01)

(52) U.S. Cl. ............................ 29/428; 29/412; 29/416; 29/469

(58) Field of Classification Search ................. 241/260, 241/261.2, 261.3, 296, 298; 29/428, 412, 29/415, 416, 469, 557
See application file for complete search history.

(56) References Cited

U.S. PATENT DOCUMENTS 267,763 A * 11/1882 Tanvez ....................... 241/298
773,363 A * 10/1904 Anderson ................... 241/298
3,459,379 A * 8/1969 Brown ......................... 241/38
3,910,511 A * 10/1975 Leider et al. ............. 241/261.3
4,813,621 A * 3/1989 Kleinhans ................ 241/261.2
5,112,443 A * 5/1992 Virving et al. ................ 162/23
5,383,617 A * 1/1995 Deuchars .................... 241/298
5,526,992 A * 6/1996 Hawen et al. ............... 241/298
5,740,972 A * 4/1998 Matthew ..................... 241/298
5,863,000 A * 1/1999 Gingras ....................... 241/28
5,921,486 A * 7/1999 Matthew ..................... 241/298
6,325,308 B1 * 12/2001 Lofgren et al. ................ 241/28
6,443,353 B1 * 9/2002 Kleinschnittger et al. ... 228/165
6,935,589 B1 * 8/2005 Matthew ..................... 241/298
7,263,755 B2 * 9/2007 Lange ......................... 29/428

* cited by examiner

*Primary Examiner*—Essama Omgba
(74) *Attorney, Agent, or Firm*—Patrick J. Walsh

(57) ABSTRACT

Replaceable refiner fillings used for refining of lignocellulosic and other natural and synthetic fibrous materials in the manufacture of paper, paperboard, and fiberboard products. The refiner fillings include a pattern of blades and spacers defined by a bar cluster, with the bar cluster being the basis of formation of the filling. A method of manufacture provides bar cluster patterns based on factors including pumping angle, plurality of segments in a refiner filling, and the number of clusters in a segment. A bar set cluster is established for uniform fabrication of bar clusters for the refiner fillings.

4 Claims, 5 Drawing Sheets

PAPERMAKING REFINER PLATES AND METHOD OF MANUFACTURE

PRIOR APPLICATION

This application is a division of U.S. patent application Ser. No. 09/462,696 filed Jul. 18, 2000, now U.S. Pat. No. 6,935,589.

FIELD OF THE INVENTION

The present invention relates to refiner plates for papermaking and refining of lignocellulosic and other natural and synthetic fibrous materials in the manufacture of paper, paperboard, and fiberboard products. In particular, the invention relates to replacable refiner fillings and to method of manufacture.

BACKGROUND OF THE INVENTION

In nearly all milled or fabricated refiner plates, and in many cast refiner plates, the working surface of the refiner plate consists of clusters of parallel bars and grooves. The refiner filling disc is normally depicted as a complete circle, but in fact the filling often consists of several more-or-less pie-shaped segments which are much easier to handle when replacing a filling.

U.S. Pat. No. 5,740,972 discloses improvements in replaceable refiner fillings and the manufacture of refiner fillings with working surfaces using relatively narrow, closely spaced bars on the working surface of the plate. The refiner fillings have relatively thin blades separated by shallower spacer bars having a thickness which determines the width of the grooves.

The refiner fillings use a metal or other hard and durable material for the blades and spacers, which blades and spacers are then metallurgically bonded to each other along their entire intercontacting surfaces. A suitable metallurgical bond is achieved through any of several known methods including welding, diffusion bonding, brazing, or any other method which results in a joint strength approaching that of the blade or spacer material. Materials used include stainless steel blades bonded to carbon steel spacers and ceramic and metal composite materials as blade or spacer components in refiner fillings. A metal composite material which exhibits suitable strength and toughness characteristics for a particular refiner application is used for the blades of the filling, while a much less costly material may be used for the spacers.

As disclosed in the '972 patent, segmental replacement disc refiner plates are produced with segments having both non-circular edges (i.e., side edges) which are not precisely radial. Instead, the side edges are oblique to the precisely radial line such that the refiner plate segmental dividing line is parallel to the adjacent refiner blade. Each segment may typically have a value of 30, 45, or 60 degrees of a circle so that 12, 8, or 6 segments, respectively comprise a refiner disc.

The blades of each cluster are positioned parallel to a side edge of the cluster and extend from the outer periphery toward the inner periphery of the segment. Blade obliqueness to the disc radius increases with distance normal to the side edge. It is desirable with refiner plates to avoid shallow crossing angles (i.e., high degree of obliquity to radial) of stator and rotor blades and therefore desirable to maintain blade obliqueness in a range of 3 to 20 degrees with respect to disc radial. Hence, the blade pattern is begun anew at that location in the refiner segment where increasing obliqueness approaches 20 degrees. So, the segment blade pattern is repeated at intervals to maintain blade obliqueness within a desired range over the entire working surface of a refiner filling. The repeated blade pattern is defined herein as a blade cluster characterized by a common cluster angle throughout the refiner filling.

An obvious method for producing the components of a blade cluster for this type of fabricated refiner plate would consist of cutting individual blades and spacers, such that for any specified set of inside diameter, outside diameter, and cluster angle, each blade and spacer would have a unique length. The uniqueness of each component, and the relative difficulty of fitting them precisely, results in a high cost to manufacture.

The present invention provides refiner fillings of the kind disclosed in the '972 patent and methods for manufacture of the fillings economically and efficiently with very significant reduction in the cost of tools and fixtures while greatly facilitating the assembly of refiner filling clusters. In particular, the invention facilitates the manufacture of refiner fillings in a preferred embodiment having a preferred range of working surface blade obliqueness to disc radial, working surface blades assembled in cluster units conforming to the range of blade obliqueness, a fixed pumping angle, and a fixed number of identical segments comprising a refiner filling.

The invention also provides a barset envelope or parallelogram as defining a basic unit of manufacture of a working surface of blades and spacers, with each barset divisible into two identical blade clusters.

SUMMARY OF THE INVENTION

The present invention provides improvements in replaceable refiner and has as a primary objective the manufacture of refiner fillings with working surfaces using relatively narrow, closely spaced bars on the working surface of the plate. This is accomplished by using relatively thin blades preferably of stainless steel, separated by shallower spacer bars preferably of carbon steel having a thickness which determines the width of the grooves, and subsequently fusing or bonding the assembled blades and spacers into a solid piece by methods appropriate for the blade and spacer materials being used.

In another primary aspect of the invention, the spacers and blades are assembled in bar sets according to a predetermined pattern, bonded together, and with each bar set cut in half to yield identical clusters. A refiner filling segment comprises a plurality of clusters bonded together. In a preferred embodiment, six clusters are assembled in edge to edge relation and bonded to form a filling segment. A complete refiner filling disc in preferred embodiment comprises eight segments.

In a preferred method, a bar set of blades and spacers is the basic unit of manufacture with the bar set configuration or envelope established in a first step. The bar set envelope is a parallelogram with its long edge coincident with a refiner filling segmental edge. The segmental edge is offset from a true radius of the refiner disc as in the '972 patent, and the offset is defined as the pumping angle of the refiner filling. The offset or pumping angle is preferably in a range of 3° to 20°. The pumping angle is also defined as the angle between the first cluster blade and the disc radius, and also as the line between blade clusters.

The number of blades and spacers comprising a bar set is selected so as to yield two identical clusters when the bar set is cut in half. A bar set cutting line is established between opposite outer and inner sides of the bar set parallelogram for cutting the bar set precisely into matching clusters.

After the bar set parallelogram is defined, blades and spacers are assembled, alternating with each other, all in parallel with the long edges of the parallelogram and of course with the design offset edge of each refiner segment, and are bonded after assembly. Several of the blades lie across the path of the cutting line and are pre-notched at their intersection of the cutting line.

After a bar set is cut into two identical bar clusters, one cluster is rotated 180° so that its outer long edge abuts the cut edge of the other cluster. A multiple of cut and rejoined clusters are assembled and bonded to form a refiner segment.

The completed segment is characterized by an integer multiple of clusters in edge to edge relationship, the first blade of each cluster having the same offset angle as the segmental edge, and the blades of each cluster having the same range of obliquity from the refiner disc radius.

The invention provides for a method of assembling clusters from only a few unique blade and spacer components. In the manufacturing method many of the blades are identical and all spacers are identical to simplify inventory of parts. A complete refiner filling disc may employ approximately 1000 blades and spacers with each bar set component having 18 blades and 19 spacers. The invention results in very significant reduction in the cost of tools and fixtures, and greatly facilitates the assembly of the clusters.

OBJECTS OF THE INVENTION

It is an object of the invention to provide refiner plates and a method for their manufacture.

It is an object of the invention to provide improved refiner plates in which bars and spacers are assembled in proper order and are fused or bonded together.

Another object of the invention is to provide efficient and economical manufacture of refiner fillings with predetermined pattern of blades and spacers.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
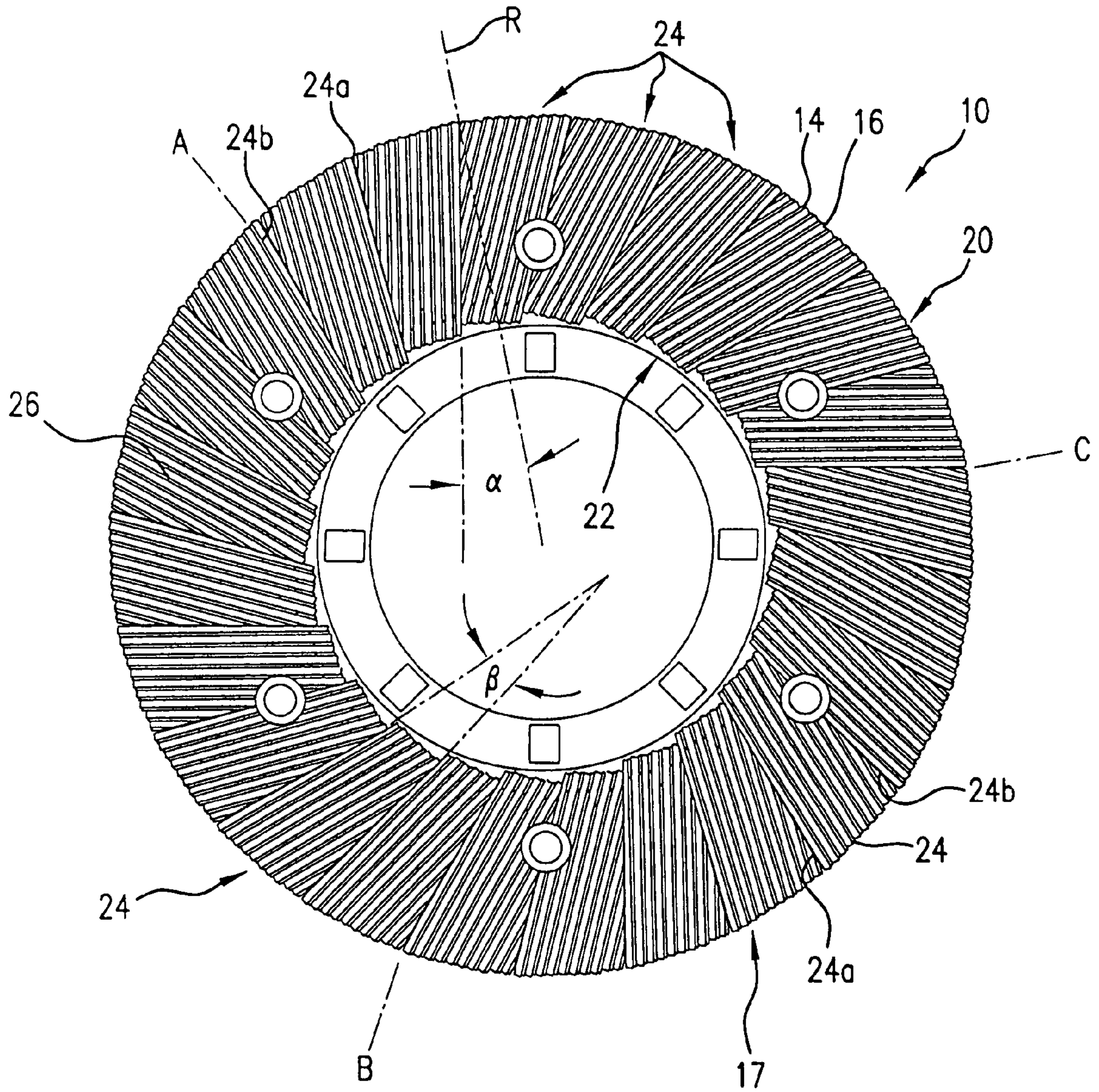
FIG. 1 is a plan view of a refiner filling disc according to the invention.

Referring to the drawing, a preferred embodiment of a refiner disc filling 10 according to the invention comprises a supporting plate 12 to which blades 14 and spacers 16 are affixed and wherein the blades and spacers define the disc working surface 17 and intervening grooves 18.

Figure 3:
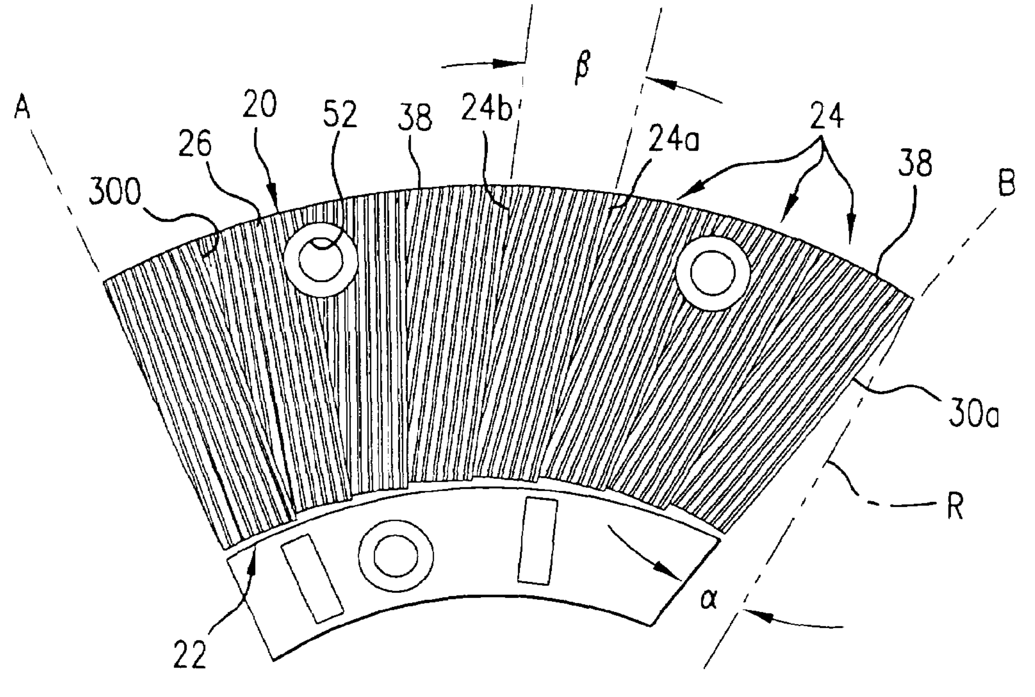
FIG. 3 is a plan view of a refiner filling segment according to the invention.
Figure 4:
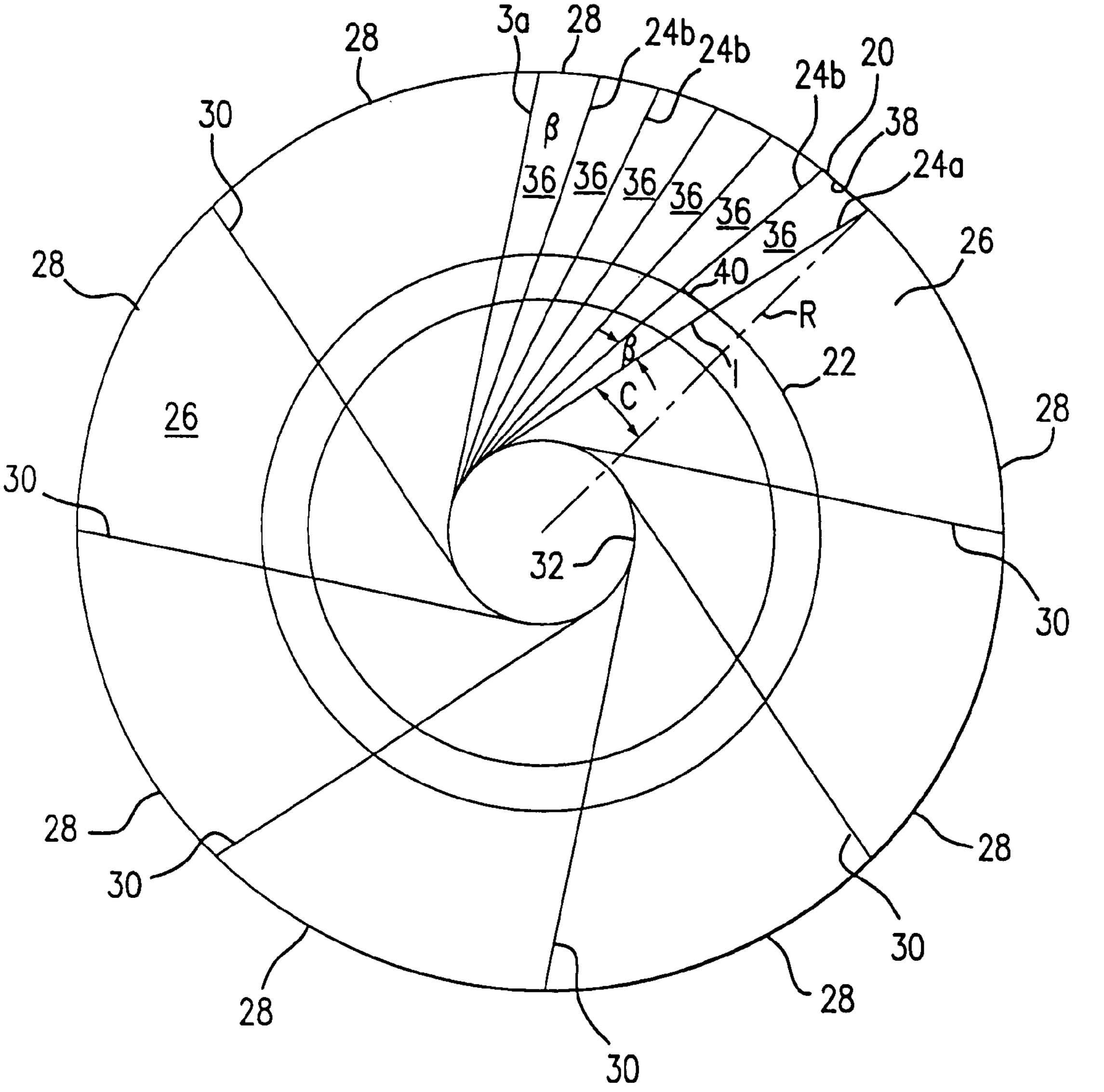
FIG. 4 is a schematic view illustrating the geometric definition of a blade and spacer cluster according to the invention.
Figure 5A:
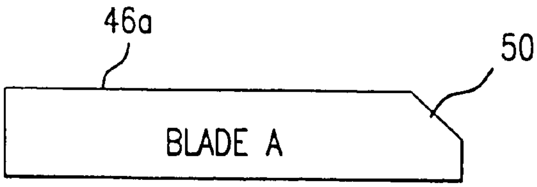
FIGS. 5*a*-5*h* are side and end elevational views of blades and spacers according to the invention.
Figure 5B:
Figure 5C:
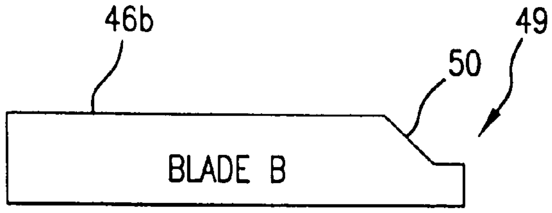
Figure 5D:
Figure 5E:
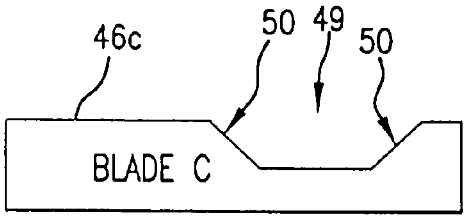
Figure 5F:
Figure 5G:
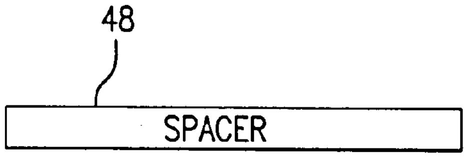
Figure 5H:

As shown in FIGS. 1, 3 and 4, in a preferred embodiment of the invention, the refiner disc filling 10 has defining margins in outer 20 and inner 22 concentric perimeters. The filling (FIG. 1) comprises a plurality of filling segments A-B, B-C, and C-A with each segment having a plurality of bar clusters 24. The outer and inner perimeter circles define an annular active refining zone 26 containing all the blades and spacers of the filling.

In the filling segment A-B of FIG. 3, each bar cluster 24 has a 10 oblique side edge 24*a* offset from the disc radius R by a specified angle alpha defined as the pumping angle, with the cluster angle beta selected always to yield an integer quotient when divided into 360°, and also when divided into the segment fraction of a circular disc, i.e., 30°, 45°, 60°, 90°, 120°, etc.

In the specific and preferred cases of:

FIG. 1, disc diameter is 16 inches, the offset angle alpha is 10°, each segment is 120° and contains 8 bar clusters, with a total of 24 bar clusters in the refiner filling, and with a cluster angle beta of 15°; and FIG. 3, disc diameter is 26 inches, the offset angle alpha is 5°, each segment is 60° and contains 8 bar clusters, with a total of 48 clusters in the refiner filling, and with a cluster angle beta of 7.5°.

The schematic layout of FIG. 4 includes a 34 inch diameter disc, with 8 segments of 6 clusters each, a cluster angle beta of 7.5° and a pumping angle alpha of 10°.

A primary aspect of the invention is the laying out of a cluster envelope which must fit within the inner and outer perimeter of the active refining zone of the circular filling, and within the two more or less radial cluster edges 24*a-b* which divide the entire circle into an integer number of clusters.

In the schematic of FIG. 4, the active refining zone 26 is divided into 8 identical segments each defined by lines 30 tangent to an inner circle 32, and with each segment subdivided by tangent lines or cluster radials 24*a-b* into 6 identical bar cluster envelopes 36. (The diameter of the inner circle 32 determines the pumping angle alpha by known geometric calculation). Each bar cluster envelope 36 is further defined by a chord 38 along the outer perimeter 20 between adjacent cluster radials 24*a*-24*b*, and by an inner line 40 parallel to outer chord 38 and passing through the intersection I of the inner perimeter 22 and one of the cluster radials 24*a*. In a finished refiner filling all blades and spacers will lie within the cluster envelope 36 generated in this manner.

The manufacturing method first prepares a bar set pattern or envelope in the form of a parallelogram. The bar set envelope receives a precise number of blades and spacers within the envelope's exterior dimensions for yielding two identical bar clusters when the envelope is cut into equal pieces. Every cluster 24 of the refiner filling is produced in this way.

Figure 6:
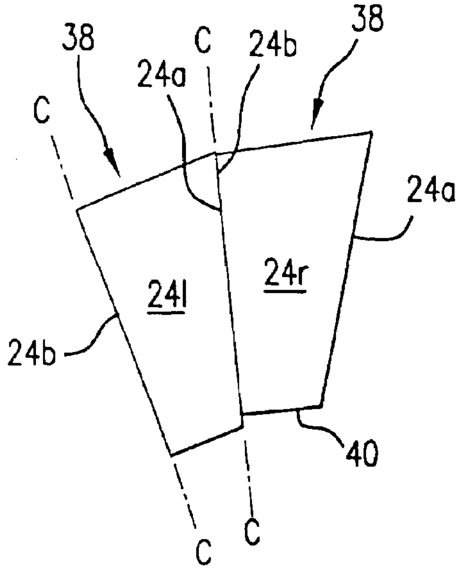
FIG. 6 illustrates the outline of adjacent bar set clusters.

An outline of adjacent bar set clusters 24*l-r* appears in FIG. 6 including oblique side edges 24*a*, 24*b*, outer chord lines 38, inner lines 40 and cut lines C-C.

Figure 7:
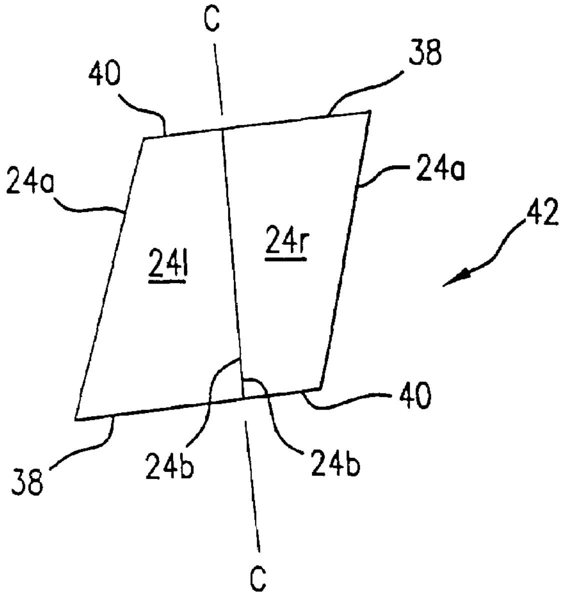
FIG. 7 illustrates the bar set clusters of FIG. 6 re-positioned to form a bar set envelope or parallelogram.

The left-hand bar set cluster outline 24*l* of FIG. 6 is re-positioned in FIG. 7 alongside cluster 24*r* to form a bar set envelope or parallelogram 42. The bar set envelope 42 consists of a pair of bar clusters with parallel oblique side edges 24*a*, 24*b*, and with the clusters abutting each other along their cut edges C-C. The ends of the bar set envelope parallelogram are formed by chords 38 and by parallel lines 40. This arrangement is shown in FIGS. 6 and 7 in which it is seen that one cluster **24*r* is in correct operational position and the other cluster 24*l* is rotated 180° to form the parallelogram pattern. In FIG. 6 representing the operating position of adjacent clusters 24*l*-*r*, cut edges C-C appear as the left edge of each cluster. In FIG. 7, cut edges C-C abut and define the line along which the bar set of assembled bars and spacers is cut by suitable means. The bar set envelope 42** defines the basic manufacturing unit for assembling and temporarily attaching blades and spacers prior to final metallurgical or other suitable bonding. The bar set envelope also facilitates use of identical bars and identical spacers throughout the entire filling.

The blades 46 and spacer 48 are shown in FIG. **5*a*-*h* and comprise 30 three blades types, including a long or unnotched blade 46*a*, an end notched blade 46*b* and a center notched blade 46*c***.

It is very advantageous that each blade's inner end be tapered 50 as shown in FIG. 5, in order to prevent fibrous material from being stapled over the end of a blade positioned at inner perimeter of the active filler zone. Such stapling can eventually lead to plugging or otherwise interrupting the uniform flow of fibrous material into the active refining area. Accordingly, a taper is formed at the end of blade **46*a*, and also as defining margins of notches 49 of blades 46*b* and 46*c* since, after a bar set is cut in half, each tapered notch margin becomes a blade inner end as is apparent in FIGS. 8, 9 and 10**.

Figure 8:
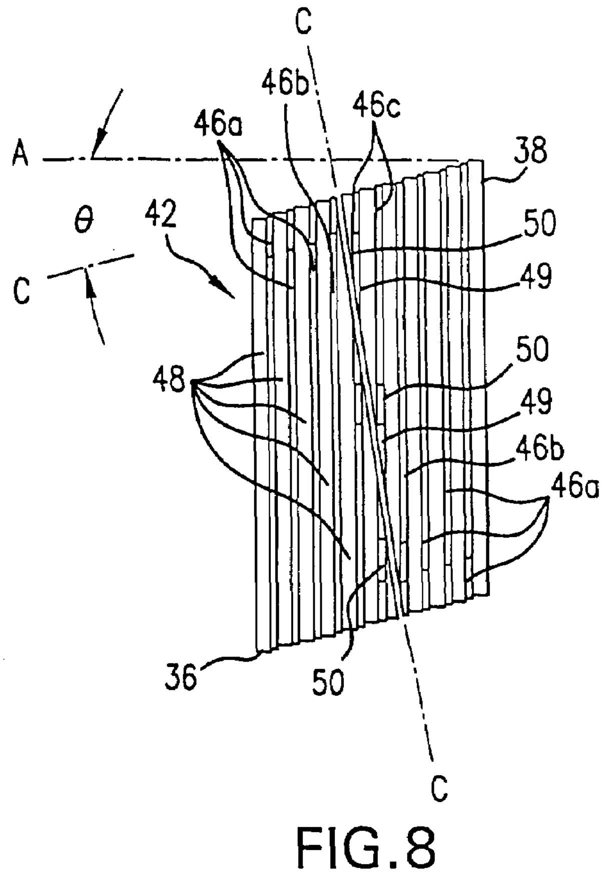
FIG. 8 illustrates a bar set of blades and spacers assembled in a bar set envelope.

Once the bar set cluster envelope 42 is defined and the desired blade and spacer widths have been selected, a precise number and length of blades and spacers are stacked to form a parallelogram of particular width, length and bar set angle theta as in FIG. 8. The dimensions of the bar set are such that the bar set may be cut in half along line C-C to form two identical bar clusters.

In the specific example of FIG. 8, blades 46 and spacers 48 are assembled alternately within the parallelogram. Blades with tapered ends 50 are put into position outside the barset cutting line C-C. Blades intersecting the cutting line are notched with the notch 49 occurring where the cutting line passes. This is shown in FIG. 8 where the cutting line passes notches in blades **46*b* and 46*c***.

Figure 2:
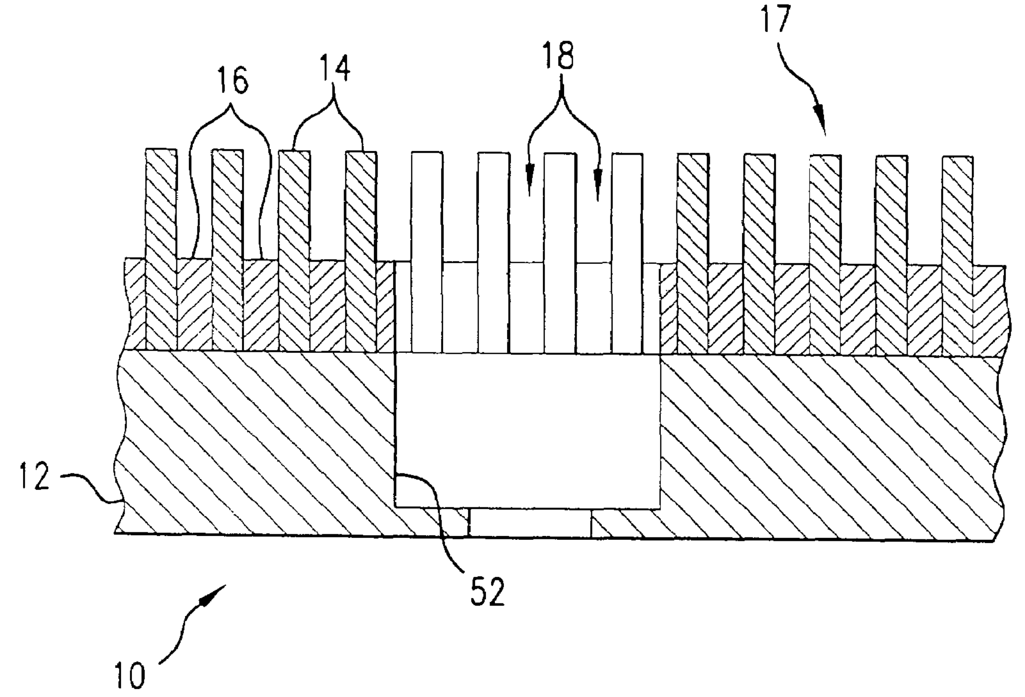
FIG. 2 is a fragmentary section view of a refining filling illustrating the positions of blades, spacers, and base plate.
Figure 9:
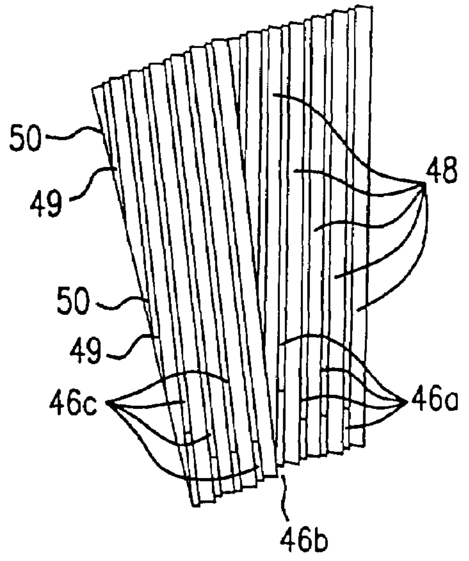
FIG. 9 illustrates the bar set of FIG. 8 cut along line C-C, and re-positioned into adjacent bar set clusters ready for assembly into a refiner segment.

After the blades and spacers are assembled and temporarily or permanently bonded, the barset is cut along the dividing line C-C into identical bar clusters 24. As shown in FIG. 9, after cutting, one of the bar set clusters is re-positioned by rotation of 180° for assembly into a refiner segment. The segments include bolt holes 52 (FIGS. 2, 3) for attachment to a refiner disc.

The method of manufacture proceeds as follows. The layout (FIG. 4) of a refiner filling is established including outer 28 and inner 22 perimeter circles defining an active refiner zone 26. A pumping angle alpha and a cluster angle beta are selected (or known) for the refiner filling and located in the layout. A relatively small cluster angle results in a short outer chord 38 which is desirable. A core circle 32 tangent to the pumping angle oblique **24*a* is formed to which circle all additional oblique lines 24*a* and 24*b* are tangent. In the example shown in FIG. 4, a cluster angle beta of 7½° is selected. A pumping angle of approximately 10° is selected and the core circle 32** is drawn.

Next, the number of segments (8 in the example of FIG. 4) is set and defined by 8 equally spaced oblique lines 30. The number of clusters per segment is determined (6 in the example) by equally spaced oblique lines 24.

In the layout, a cluster envelope 36 is defined by adjacent obliques **24*a*-*b*, a chord 38 between the intersections of the obliques and the outer perimeter circle 28, and by an inner line 40 parallel to the chord and passing through the intersection I of the inner perimeter circle 22 and one oblique 24*a***.

A bar set envelope 42 (FIGS. 6 and 7) is defined by a pair of cluster envelopes **24*l*-*r* with one cluster 24*r* oriented as in FIG. 3, and the other cluster envelope 241 rotated 180° to define a parallelogram with the one cluster envelope. That is, the left edges 24*b* of the cluster envelopes 24*l*-*r* seen in FIG. 7** define a cutting line C-C along which the bar set is cut to form the cluster envelopes. The bar set envelope next receives blades and spacers sized in length and width to fit precisely within the envelope.

An assembly of blades and spacers appears in FIG. 8, including end tapered blades, and pre-notched blades with notches defined by tapered ends and with the notches situated in the cutting line. After assembly the blades and spacers are affixed to each other by means appropriate to the materials used. For example, blades and spacers may be metallurgically bonded entirely throughout the interconnecting surfaces of blades and spacers for the bar set, and then cut along the cutting line to form bar clusters. Alternatively, the bars and spacers maybe temporarily attached as by tack welding prior to cutting, and bonded after cutting.

Figure 10:
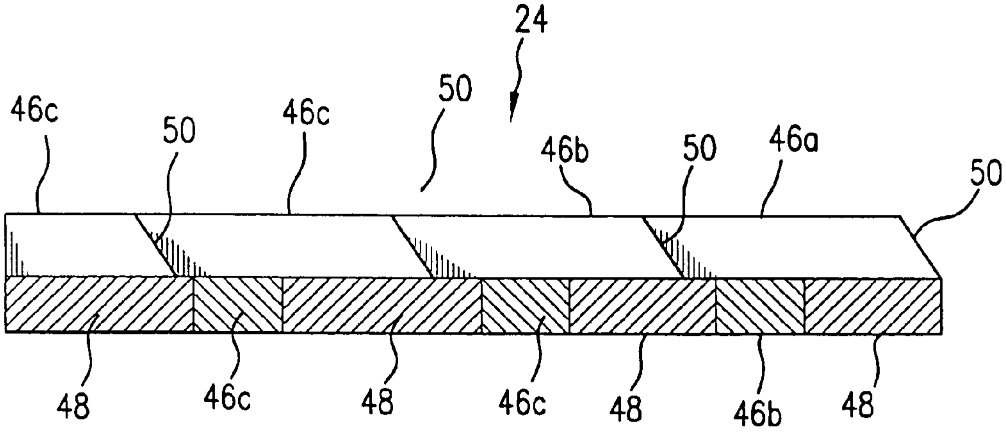
FIG. 10 is a side elevation view of a bar set cluster along cut line C-C.

FIG. 10 illustrates the cut edge of a bar set cluster along line C-C. In this profile view the cut line diagonally intersects blades **46*c* through their notches, and diagonally through spacers 48. Blade 46*a* is not cut and terminates in tapered end 50**.

Various changes may be made to the structure embodying the principles of the invention. The principles of the invention, while described in preferred embodiment of refiner disc segments, are also applicable to other configurations of refiner fillings. For example, the invention also has application to working surfaces of refiners in conical or other types of refiners.

The foregoing embodiments are set forth in an illustrative and not in a limiting sense. The scope of the invention is defined by the claims appended hereto.

I claim:

1. A method of manufacture of a refiner filling having outer and inner perimeters defining an active refining zone of the refiner filling, having a pumping angle off-set from a radial of the refiner filling and having blades and spacers, the method characterized in the steps of:

subdividing the filling into equal segments with each segment having spaced edges extending between the inner and outer perimeters, and with one segment edge lying along a pumping angle off-set from a radial;

subdividing the segments into bar set clusters with each cluster having an outline and having an edge defining said pumping angle;

combining the outline of two clusters to form a bar set envelope;

assembling blades and spacers in the bar set envelope;

severing the bar set envelope into two equal bar set clusters;

assembling said clusters to form a refiner segment; and assembling said segments to form a refiner filling.

2. A method according to claim 1 in which the refiner filling is a disc of 360°, the segments each having degree value as an integer of 360°, and the pumping angle being evenly divisible into 360°, and into the degree value of the segments.

3. A method of manufacture of a refiner filling having blades and spacers comprising the steps of:

establishing the defining margins of an active refining zone of the refiner filling;

selecting a pumping angle of the refiner filling;

subdividing the filling into equal segments with each segment having spaced edges extending between the defining margins, and with one segment edge lying along a pumping angle;

subdividing the segments into bar set clusters with each cluster having an outline and having an edge defining pumping angle;

combining the outline of two clusters to form a bar set envelope;

assembling blades and spacers in the bar set envelope;

severing the bar set envelope into two equal bar set clusters;

assembling said clusters to form a refiner segment; and assembling said segments to form a refiner filling.

4. A method of manufacture of bar set clusters having blades and spacers comprising the steps of:

establishing the outer and inner perimeters of an active refining zone of the refiner;

selecting a pumping angle off-set from a radial of the refiner filling;

subdividing the filling into equal segments with each segment having spaced edges extending between said inner and outer perimeters, and with one segment edge lying along a pumping angle off-set from a radial;

subdividing the segments into bar set clusters with each cluster having an outline and having an edge defining said pumping angle;

combining the outline of two clusters to form a bar set envelope;

assembling blades and spacers in the bar set envelope; and;

severing the bar set envelope into two equal bar set clusters.

* * * * *